United States Patent
Hashizume et al.

(10) Patent No.: US 9,299,985 B2
(45) Date of Patent: Mar. 29, 2016

(54) SECONDARY BATTERY AND ELECTROLYTE SOLUTION FOR SECONDARY BATTERY TO BE USED IN SAME

(75) Inventors: Yoko Hashizume, Tokyo (JP); Daisuke Kawasaki, Tokyo (JP); Masahiro Suguro, Tokyo (JP); Midori Shimura, Tokyo (JP); Kazuaki Matsumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 430 days.

(21) Appl. No.: 13/879,327

(22) PCT Filed: Jun. 23, 2011

(86) PCT No.: PCT/JP2011/064440
§ 371 (c)(1),
(2), (4) Date: Jun. 13, 2013

(87) PCT Pub. No.: WO2012/049889
PCT Pub. Date: Apr. 19, 2012

(65) Prior Publication Data
US 2013/0260218 A1  Oct. 3, 2013

(30) Foreign Application Priority Data

Oct. 14, 2010  (JP) ................................ 2010-231588

(51) Int. Cl.
*H01M 10/0563* (2010.01)
*H01M 4/485* (2010.01)
(Continued)

(52) U.S. Cl.
CPC .............. *H01M 4/485* (2013.01); *H01M 4/134* (2013.01); *H01M 4/1395* (2013.01);
(Continued)

(58) Field of Classification Search
None
See application file for complete search history.

(56) References Cited

U.S. PATENT DOCUMENTS

2003/0215711 A1* 11/2003 Aramata et al. ........... 429/218.1
2006/0134520 A1*  6/2006 Ishii et al. .................... 429/223
2007/0099081 A1*  5/2007 Matsuda et al. ............. 429/217

FOREIGN PATENT DOCUMENTS

JP  06-325765 A  11/1994
JP  09-265989 A  10/1997
(Continued)

OTHER PUBLICATIONS

English translatin of JP2003-208920A 2003.*
(Continued)

*Primary Examiner* — Patrick Ryan
*Assistant Examiner* — Lucas J O Donnell
(74) *Attorney, Agent, or Firm* — Sughrue Mion, PLLC

(57) ABSTRACT

Provided is a secondary battery having a good battery property at a high temperature. A secondary battery according to an exemplary embodiment of the invention comprises a negative electrode and an electrolyte liquid; wherein the negative electrode is formed by binding a negative electrode active substance on a negative electrode collector with a negative electrode binder; and wherein the electrolyte liquid comprises a compound (A) having a C=S bond. In this embodiment, the negative electrode active substance is formed by covering at least one of a metal (a) that can be alloyed with lithium and a metal oxide (b) that can absorb and desorb a lithium ion with a carbon material (c). Alternatively, the negative electrode active substance comprises a metal (a) that can be alloyed with lithium and the negative electrode binder negative electrode is a polyimide or a polyamide-imide.

27 Claims, 1 Drawing Sheet

(51) Int. Cl.
    *H01M 4/134*     (2010.01)
    *H01M 4/1395*     (2010.01)
    *H01M 4/36*     (2006.01)
    *H01M 4/38*     (2006.01)
    *H01M 4/587*     (2010.01)
    *H01M 4/62*     (2006.01)
    *H01M 10/0525*     (2010.01)
    *H01M 10/0567*     (2010.01)
    *H01M 10/0585*     (2010.01)

(52) U.S. Cl.
    CPC ............ *H01M 4/366* (2013.01); *H01M 4/386* (2013.01); *H01M 4/587* (2013.01); *H01M 4/622* (2013.01); *H01M 10/0525* (2013.01); *H01M 10/0563* (2013.01); *H01M 10/0567* (2013.01); *H01M 10/0585* (2013.01); *Y02E 60/122* (2013.01); *Y02T 10/7011* (2013.01)

(56) References Cited

FOREIGN PATENT DOCUMENTS

| | | |
|---|---|---|
| JP | 2001-185215 A | 7/2001 |
| JP | 2002-231306 A | 8/2002 |
| JP | 2003-123740 A | 4/2003 |
| JP | 2003-163031 A | 6/2003 |
| JP | 2003-208920 A | 7/2003 |
| JP | 2004-022433 A | 1/2004 |
| JP | 2004-047404 A | 2/2004 |
| JP | 2004-055471 A | 2/2004 |
| JP | 2007-095670 A | 4/2007 |
| JP | 2007-207490 A | 8/2007 |
| JP | 2007-242405 A | 9/2007 |
| JP | 2010-521050 A | 6/2010 |

OTHER PUBLICATIONS

International Search Report of PCT/JP2011/064440, dated Oct. 4, 2011.

* cited by examiner

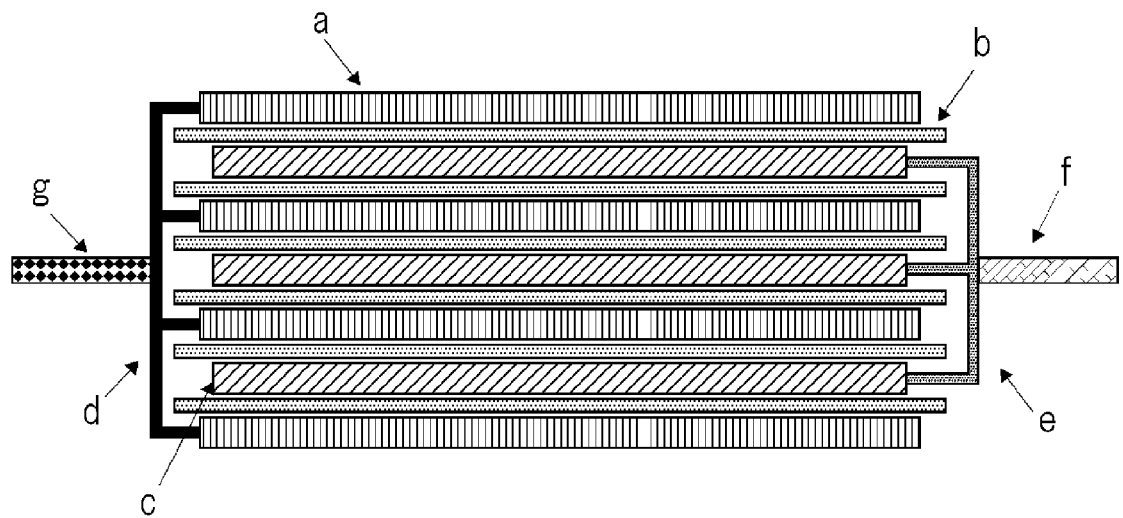

SECONDARY BATTERY AND ELECTROLYTE SOLUTION FOR SECONDARY BATTERY TO BE USED IN SAME

CROSS REFERENCE TO RELATED APPLICATIONS

This is a National Stage of International Application No. PCT/JP2011/064440 filed Jun. 23, 2011, claiming priority based on Japanese Patent Application No. 2010-231588 filed Oct. 14, 2010, the contents of all of which are incorporated herein by reference in their entirety.

TECHNICAL FIELD

An exemplary aspect of the invention relates to a secondary battery and an electrolyte liquid used for the same, and particularly to a lithium ion secondary battery and an electrolyte liquid used for the same.

BACKGROUND ART

With the rapidly expansion of the market for laptop computers, mobile phones, electric vehicles, and the like, a secondary battery having a high energy density is required. Examples of a method for obtaining a secondary battery having a high energy density include a method in which a negative electrode material having a large capacity is used, and a method in which an nonaqueous electrolyte liquid having an excellent stability is used.

Patent Document 1 discloses using a silicon oxide or a silicate as a negative electrode active substance of a secondary battery. Patent Document 2 discloses a negative electrode for a secondary battery which has an active substance layer containing a carbon material particle that can absorb and desorb lithium ion, a metal particle that can be alloyed with lithium, and an oxide particle that can absorb and desorb lithium ion. Patent Document 3 discloses a negative electrode material for a secondary battery which is formed by coating the surface of a particle, which has a structure in which a silicon fine crystal is dispersed in a silicon compound, with carbon.

Patent Documents 4 and 5 disclose using a polyimide as a negative electrode binder in the case where a negative electrode active substance contains silicon. Patent Documents 6 to 10 disclose using an electrolyte liquid containing a compound having a C=S bond.

CITED REFERENCE

Patent Document

Patent Document 1: JP 6-325765 A
Patent Document 2: JP 2003-123740 A
Patent Document 3: JP 2004-47404 A
Patent Document 4: JP 2004-22433 A
Patent Document 5: JP 2007-95670 A
Patent Document 6: JP 2001-185215 A
Patent Document 7: JP 2003-163031 A
Patent Document 8: JP 2003-208920 A
Patent Document 9: JP 2004-55471 A
Patent Document 10: JP 2010-521050 A

SUMMARY OF THE INVENTION

Problem to be Solved by the Invention

However, when charging and discharging are carried out at 45° C. or higher in the case where the silicon oxide disclosed in Patent Document 1 is used as a negative electrode active substance, there has been a problem in which capacity deterioration associated with the charge/discharge cycle may be significantly large. The negative electrode for a secondary battery disclosed in Patent Document 2 has an effect in which the volume change of the negative electrode as a whole is relaxed due to the different charge/discharge electric potential of three kinds of components when lithium is absorbed and desorbed. However, in Patent Document 2, there have been some points which have not been sufficiently studied, regarding a relationship among three kinds of components in a state of coexistence, and regarding a binder, an electrolyte liquid, a conformation of an electrode assembly, and a package which are indispensable for fabricating a lithium ion secondary battery. The negative electrode material for a secondary battery disclosed in Patent Document 3 also has an effect in which the volume change of the negative electrode as a whole is relaxed. However, in Patent Document 3, there have been some points which are not sufficiently studied, regarding a binder, an electrolyte liquid, a conformation of an electrode assembly, and a package which are indispensable for fabricating a lithium ion secondary battery.

In Patent Documents 4 and 5, the study regarding the state of the negative electrode active substance is insufficient, and there have been some points which have not been sufficiently studied, regarding an electrolyte liquid, a conformation of an electrode assembly, and a package which are indispensable for fabricating a lithium ion secondary battery. In Patent Documents 6 to 10, the study regarding a relationship between the kind of the compound having a C=S bond and the battery property is insufficient, and there have been some points which have not been sufficiently studied, regarding a negative electrode active substance, a binder, a conformation of an electrode assembly, and a package which are indispensable for a formation of a lithium ion secondary battery.

In particular, in the field of the lithium ion secondary battery, there has been a problem of deterioration of the battery properties such as the rate property and the cycle property when charging and discharging are carried out at a high temperature, and it has been desired that the technology to solve it is developed.

Thus, the object of an exemplary aspect of the invention is to provide a secondary battery and an electrolyte liquid for a secondary battery having a good battery property at a high temperature.

Means of Solving the Problem

An exemplary aspect of the invention is a secondary battery, comprising a negative electrode and an electrolyte liquid; wherein the negative electrode is formed by binding a negative electrode active substance on a negative electrode collector with a negative electrode binder; and wherein the electrolyte liquid comprises a compound (A) having a C=S bond. In a first embodiment, the negative electrode active substance is formed by covering at least one of a metal (a) that can be alloyed with lithium and a metal oxide (b) that can absorb and desorb a lithium ion with a carbon material (c). In a second embodiment, the negative electrode active substance comprises a metal (a) that can be alloyed with lithium and the negative electrode binder is a polyimide or a polyamide-imide.

An exemplary aspect of the invention is an electrolyte liquid for a secondary battery, comprising a compound having a partial structure represented by any one of following formulae (i) to (iii):

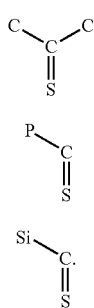

Effect of the Invention

According to an exemplary aspect of the invention, a secondary battery having a good battery property at a high temperature can be provided.

BRIEF DESCRIPTION OF DRAWINGS

FIG. 1 is a schematic cross-sectional view showing a conformation of an electrode assembly in a stacked laminate type secondary battery.

MODE FOR CARRYING OUT THE INVENTION

As follows, an exemplary embodiment of the invention is explained in detail.

In a secondary battery according to an exemplary embodiment of the present invention, for example, an electrode assembly in which a positive electrode and a negative electrode are oppositely disposed and an electrolyte liquid are enclosed inside a package. A shape of the secondary battery may be any type selected from among a cylindrical type, a flat wound rectangular type, a stacked rectangular type, a coin type, a flat wound laminate type and a stacked laminate type, but is preferably a stacked laminate type. As follows, a secondary battery of a stacked laminate type is explained.

FIG. 1 is a schematic cross-sectional view showing a conformation of an electrode assembly in a stacked laminate type secondary battery. This electrode assembly is formed by alternately stacking plural positive electrodes c and plural negative electrodes a with separator b placed therebetween. Positive electrode collector e in each positive electrode c is electrically connected by being welded to one another at the end part thereof which is not covered with a positive electrode active substance, and further positive electrode terminal f is welded to the welded part. Negative electrode collector d in each negative electrode a is electrically connected by being welded to one another at the end part thereof which is not covered with a negative electrode active substance, and further negative electrode terminal g is welded to the welded part.

Since an electrode assembly having such a planar stacked structure has no portion of a small R (a region near a winding core of a wound structure), an advantage of the electrode assembly is that it is less adversely affected by volume change of the electrode that occurs in the charge/discharge cycle than an electrode assembly having a wound structure. Therefore, the electrode assembly is useful when using an active substance in which a volume expansion is liable to occur. On the other hand, since the electrode in the electrode assembly having a wound structure is bent, distortion of the conformation easily occurs due to the generation of volume change. In particular, in the case of using a negative electrode active substance such as a silicon oxide which generates large volume change associated with charging and discharging, large capacity deterioration associated with charging and discharging occurs in a secondary battery using an electrode assembly having a wound structure.

However, the electrode assembly having a planar stacking structure has a problem that a gas generated between the electrodes easily accumulates between the electrodes. This is because, in the case of the electrode assembly having a stacking structure, it is easy to extend the space between the electrodes, while, in the case of the electrode assembly having a wound structure, the electrodes are tensioned therebetween and thereby the space between the electrodes is hard to be extended. In the case where the package is an aluminum lamination film, this problem becomes particularly significant.

An exemplary embodiment of the invention can solve the above-mentioned problem, and can provide a lithium ion secondary battery using a high energy type negative electrode, which enables long-life operation thereof.

[1] Negative Electrode

A negative electrode is formed by binding a negative electrode active substance on a negative electrode collector with a negative electrode binder so that the negative electrode active substance covers the negative electrode collector. Here, in a first embodiment, a negative electrode active substance formed by covering at least one of a metal (a) that can be alloyed with lithium and a metal oxide (b) that can absorb and desorb a lithium ion with a carbon material (c) is used. That is, in the negative electrode active substance, only any one of metal (a) and metal oxide (b) may be coated in carbon material (c), and both metal (a) and metal oxide (b) may be coated in carbon material (c). Also, in a second embodiment, a negative electrode active substance containing metal (a) that can be alloyed with lithium is used. The negative electrode active substance preferably contains metal (a) and metal oxide (b). The negative electrode active substance may further contain carbon material (c), and more preferably contains metal (a), metal oxide (b) and carbon material (c).

As metal (a), Al, Si, Pb, Sn, In, Bi, Ag, Ba, Ca, Hg, Pd, Pt, Te, Zn, La or an alloy of two or more kinds thereof can be used. In particular, it is preferable to contain silicon (Si) as metal (a). The content of metal (a) in the negative electrode active substance is preferably 5 mass % or more and 95 mass % or less, is more preferably 10 mass % or more and 90 mass % or less, and is further preferably 20 mass % or more and 50 mass % or less. Note that, in a first embodiment, the content of metal (a) in the negative electrode active substance may be 0 mass % and may be 100 mass %. Also, in a second embodiment, the content of metal (a) in the negative electrode active substance should be over 0 mass % and may be 100 mass %.

As metal oxide (b), silicon oxide, aluminum oxide, tin oxide, indium oxide, zinc oxide, lithium oxide or a complex thereof can be used. In particular, it is preferable to contain silicon oxide as metal oxide (b). This is because silicon oxide is relatively stable and is hard to cause a reaction with another chemical compound. Also, one element or two or more elements selected from nitrogen, boron and sulfur can be added as metal oxide (b), for example, in an amount of 0.1 to 5 mass %. By this, electroconductivity of metal oxide (b) can be improved. The content of metal oxide (b) in the negative electrode active substance may be 0 mass % and may be 100 mass %, but is preferably 5 mass % or more and 90 mass % or less, is more preferably 40 mass % or more and 80 mass % or less, and is further preferably 50 mass % or more and 70 mass % or less.

As for metal oxide (b), all or a part thereof preferably has an amorphous structure. Metal oxide (b) having an amorphous structure can suppress the volume expansion of carbon material (c) or metal (a) that are another negative electrode active substance and can also suppress decomposition of an electrolyte liquid containing a phosphate compound. This mechanism is not obvious, but the amorphous structure of metal oxide (b) is presumed to have some influences on a coating formation at an interface between carbon material (c) and an electrolyte liquid. Also, the amorphous structure has a relatively small constituent due to ununiformity such as a crystal grain boundary or a defect. Note that, it can be confirmed by X-ray diffraction measurement (general XRD measurement) that all or a part of metal oxide (b) has an amorphous structure. Specifically, in the case where metal oxide (b) does not have an amorphous structure, a peak peculiar to metal oxide (b) is observed, while in the case where all or a part of metal oxide (b) has an amorphous structure, a observed peak peculiar to metal oxide (b) becomes to be broad.

Also, in the case where the negative electrode active substance contains metal (a) and metal oxide (b), as for metal (a), all or a part thereof is preferably dispersed in metal oxide (b). The dispersion of at least a part of metal (a) in metal oxide (b) can further suppress the volume expansion of the negative electrode as a whole and can also suppress decomposition of an electrolyte liquid. Note that, it can be confirmed by transmission electron microscope observation (general TEM observation) and along with energy dispersive X-ray spectroscopy measurement (general EDX measurement) that all or a part of metal (a) is dispersed in metal oxide (b). Specifically, a section of a specimen containing metal particle (a) is observed and an oxygen atom concentration of metal particle (a) which is dispersed in metal oxide (b) is measured, and thereby it can be confirmed that a metal which constitutes metal particle (a) does not become an oxide.

Further, in the case where the negative electrode active substance contains metal (a) and metal oxide (b), metal oxide (b) is preferably an oxide of metal which constitutes metal (a).

A negative electrode active substance, in which metal (a), metal oxide (b) and carbon material (c) are contained, in which all or a part of metal oxide (b) has an amorphous structure, and in which all or a part of metal (a) is dispersed in metal oxide (b), can be produced, for example, by a method disclosed in Patent Document 3. That is, a CVD processing of metal oxide (b) is carried out under an atmosphere containing an organic substance gas such as methane gas, to obtain a complex in which metal (a) in metal oxide (b) is a nanocluster and in which the surface is covered with carbon material (c). Also, the above-mentioned negative electrode active substance is produced by mixing metal (a), metal oxide (b) and carbon material (c) by mechanical milling. A negative electrode active substance in which metal (a) or metal oxide (b) is coated with carbon material (c) can be produced by mixing metal (a) or metal oxide (b) and carbon material (c) by mechanical milling.

In the case where the negative electrode active substance contains metal (a) and metal oxide (b), the ratio of metal (a) and metal oxide (b) is not particularly limited. The content of metal (a) is preferably 5 mass % more and 90 mass % or less with respect to the total of metal (a) and metal oxide (b), and is preferably 30 mass % more and 60 mass % or less. The content of metal oxide (b) is preferably 10 mass % more and 95 mass % or less with respect to the total of metal (a) and metal oxide (b), and is preferably 40 mass % more and 70 mass % or less.

As carbon material (c), graphite, amorphous carbon, diamond-like carbon, carbon nanotube or a complex thereof can be used. Here, graphite having a high crystallinity has high electroconductivity and an excellent adhesiveness with a positive electrode collector consisting of copper or the like as well as an excellent voltage flatness. On the other hand, since amorphous carbon having a low crystallinity has a relatively low volume expansion, there is a high effect of relaxing the volume expansion of the whole of the negative electrode, and the deterioration due to ununiformity such as a crystal grain boundary or a defect hardly occurs. The content of carbon material (c) in the negative electrode active substance is preferably 2 mass % or more and 50 mass % or less, and is more preferably 2 mass % or more and 30 mass % or less. Note that, in a first embodiment, the content of carbon material (c) in the negative electrode active substance should be over 0 mass %. Also, in a second embodiment, the content of carbon material (c) in the negative electrode active substance may be 0 mass %.

In the case where the negative electrode active substance contains metal (a), metal oxide (b) and carbon material (c), the ratio of metal (a), metal oxide (b) and carbon material (c) is not particularly limited. The content of metal (a) is preferably 5 mass % more and 90 mass % or less with respect to the total of metal (a), metal oxide (b) and carbon material (c), and is preferably 20 mass % more and 50 mass % or less. The content of metal oxide (b) is preferably 5 mass % more and 90 mass % or less with respect to the total of metal (a), metal oxide (b) and carbon material (c), and is preferably 40 mass % more and 70 mass % or less. The content of carbon material (c) is preferably 2 mass % more and 50 mass % or less with respect to the total of metal (a), metal oxide (b) and carbon material (c), and is preferably 2 mass % more and 30 mass % or less.

Also, each of metal (a), metal oxide (b) and carbon material (c) used can be, but should not particularly be limited to, a particle thereof. For example, the average particle diameter of metal (a) can be constituted in a range smaller than the average particle diameter of carbon material (c) and the average particle diameter of metal oxide (b). By this constitution, since metal (a) in which the volume change associated with charge and discharge is small has a relatively small particle diameter, and since carbon material (c) and metal oxide (b) in which the volume change is large has a relatively large particle diameter, the dendrite generation and the pulverization of alloy are more effectively suppressed. Also, in the process of charge and discharge, lithium is absorbed and desorbed from the larger diameter particle, the smaller diameter particle and the larger diameter particle in this order. From this point, the residual stress and the residual strain are suppressed. The average particle diameter of metal (a) can be, for example, 20 μm or less, and is preferably 15 μm or less.

Also, it is preferable that the average particle diameter of metal oxide (b) is a half or less of the average particle diameter of carbon material (c), and it is preferable that the average particle diameter of metal (a) is a half or less of the average particle diameter of metal oxide (b). Further, it is more preferable that the average particle diameter of metal oxide (b) is a half or less of the average particle diameter of carbon material (c) as well as that the average particle diameter of metal (a) is a half or less of the average particle diameter of metal oxide (b). The control of the average particle diameter in this range can more effectively give the relaxation effect of the volume expansion of the metal and alloy phase, and can provide a secondary battery having an excellent balance of an energy density, a cycle life and an efficiency. More specifically, it is preferable that the average particle diameter of silicon oxide (b) is a half or less of the average particle diameter of graphite (c) and that the average particle diameter of silicon (a) is a half or less of the average particle diameter of silicon oxide (b). Also, more specifically, the average particle diameter of silicon (a) can be, for example, 20 μm or less, and is preferably 15 μm or less.

As a negative electrode binder, a polyvinylidene fluoride (PVdF), a vinylidene fluoride-hexafluoropropylene copolymer, a vinylidene fluoride-tetrafluoroethylene copolymer, a styrene-butadiene copolymerized rubber, a polytetrafluoroethylene, a polypropylene, a polyethylene, a polyimide (PI), a polyamide-imide (PAI) or the like can be used. In particular, in a second embodiment, from the strong binding property, a polyimide or a polyamide-imide is used. Also, in a first embodiment, from the strong binding property, a polyimide or a polyamide-imide is preferable. The amount of the negative electrode binder used is preferably 5 to 25 parts by mass with respect to 100 parts by mass of the negative electrode active substance, from the standpoint of "sufficient binding force" and "high energy" which are trade-off to each other.

A negative electrode collector is preferably aluminum, nickel, copper, silver and an alloy thereof from the electrochemical stability. Examples of the shape thereof include foil, flat plate and mesh.

A negative electrode can be produced by forming a negative electrode active substance layer containing a negative electrode active substance and a negative electrode binder on a negative electrode collector. Examples of the method for forming the negative electrode active substance layer include doctor blade method, die coater method, CVD method, and sputtering method. A negative electrode active substance layer is first formed, and a thin film of aluminum, nickel or an alloy thereof is thereafter formed by vapor deposition, sputtering or the like for a negative electrode collector.

[2] Positive Electrode

A positive electrode is formed, for example, by binding a positive electrode active substance on a positive electrode collector with a positive electrode binder so that the positive electrode active substance covers the positive electrode collector.

Examples of the positive electrode active substance include lithium manganates having a lamellar structure or lithium manganates having a Spinel structure such as $LiMnO_2$ and $Li_xMn_2O_4$ (0<x<2); $LiCoO_2$, $LiNiO_2$ and compounds in which a part of the transition metal thereof are substituted with another metal; lithium transition metal oxides such as $LiNi_{1/3}Co_{1/3}Mn_{1/3}O_2$ in which the molar ratio of a particular transition metal is not more than one half; and compounds which have lithium at a larger amount than the stoichiometric amount in these lithium transition metal oxides. In particular, $Li_\alpha Ni_\beta Co_\gamma Al_\delta O_2$ ($1 \leq \alpha \leq 1.2$, $\beta+\gamma+\delta=1$, $\beta \geq 0.7$, and $\gamma \geq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, and $\gamma \leq 0.2$) is preferable. The positive electrode active substance can be used alone, or in combination with two or more kinds.

As a positive electrode binder, the same materials as a negative electrode binder can be used. Among these, from the standpoint of versatility and low cost, polyvinylidene fluorides are preferable. The amount of the positive electrode binder used is preferably 2 to 10 parts by mass with respect to 100 parts by mass of the positive electrode active substance from the standpoint of "sufficient binding force" and "high energy" which are trade-off to each other.

As a positive electrode collector, the same materials for a negative electrode collector can be used.

For the purpose of reducing the impedance, an electroconductive auxiliary material may be added to a positive electrode active substance layer containing a positive electrode active substance. Examples of the electroconductive auxiliary material include carbonaceous fine particles such as graphite, carbon black and acetylene black.

[3] Electrolyte Liquid

An electrolyte liquid used an exemplary embodiment of the invention contains a compound (A) having a C=S bond (a structure in which a C atom and an S atom have double-bonded). Compound (A) can be used alone, or in combination with two or more kinds.

By an electrolyte liquid containing compound (A), the battery property at a high temperature is significantly improved. That is, since the C=S bond has a high reactivity, it is thought that compound (A) is selectively reacted with a surface of the negative electrode to form a stable coating and thereby that the generation of a gas in the negative electrode is effectively suppressed and deterioration of the battery property under an environment at a high temperature is suppressed.

Specific examples of compound (A) include compounds represented by following formulae (I) to (III):

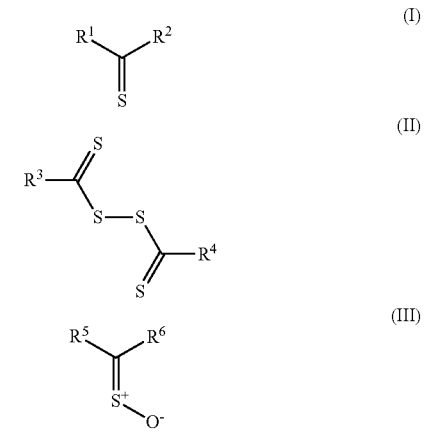

[In formulae (I) to (III), $R^1$ to $R^6$ are each independently a substituted or non-substituted alkyl group, a substituted or non-substituted alkylene group, a substituted or non-substituted cycloalkyl group, a substituted or non-substituted aryl group, a substituted or non-substituted heterocyclic group, —NR'$_2$, —N=R', —N=C=O, —N=S=O, —SiR'$_3$, —SR' or —P(=O)(OR')$_2$, and R' is each independently a substituted or non-substituted alkyl group, a substituted or non-substituted alkylene group, a substituted or non-substituted cycloalkyl group, a substituted or non-substituted aryl group or a substituted or non-substituted heterocyclic group.].

A compound represented by formula (I) or (II) is preferable and a compound represented by formula (I) is more preferable. Here, examples of the substituent include halogen atoms, alkyl groups, alkoxy groups, alkylthio groups, cycloalkyl groups, cycloalkoxy groups, cycloalkylthio groups, aryl groups, aryloxy groups, arylthio groups, heterocyclic groups, heterocyclic oxy groups, heterocyclic thio group, nitro group, cyano group and groups consisting of the combination thereof. Examples of the halogen atom include fluorine, chlorine, bromine and iodine. The carbon number of $R^1$ to $R^6$ may be 0, but is preferable 1 to 30, is more preferable 4 to 20, and is further preferably 6 to 10. The number of the substituent may be 1 or may be 2 or more.

Among these, compound (A) has a partial structure represented by any one of following formulae (i) to (iii):

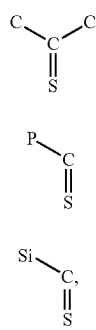

and more preferably has a partial structure represented by formula (iii). It is preferable that the C atom in formula (ii) is further bonded to a P atom or a C atom. It is preferable that the C atom in formula (iii) is further bonded to a P atom or a C atom. When compound (A) is represented by any one of formulae (i) to (iii), it is thought that a more uniform coating is easy to be formed on the surface of the negative electrode and thereby that the battery property under an environment at a high temperature becomes good, but the reason for this is not clear. In particular, when compound (A) has a partial structure represented by formula (iii), it is thought that a more uniform coating having good ion conductivity is easy to be formed on the surface of the negative electrode due to an interaction with Si in the negative electrode active substance and thereby that the battery property under an environment at a high temperature becomes good.

Specific examples of compound (A) having a partial structure represented by formula (i) include:

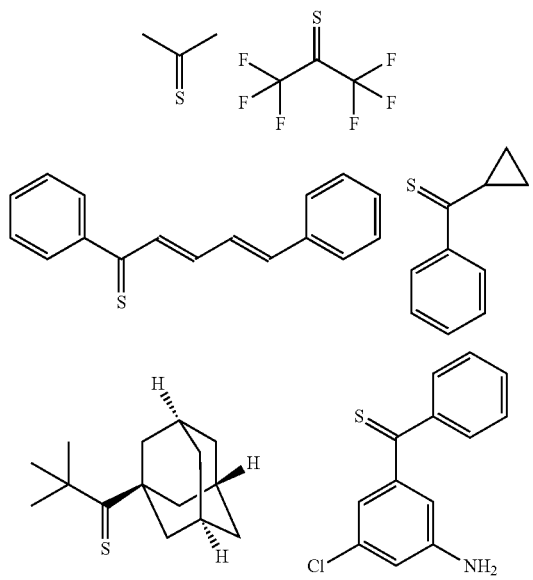

Specific examples of compound (A) having a partial structure represented by formula (ii) include:

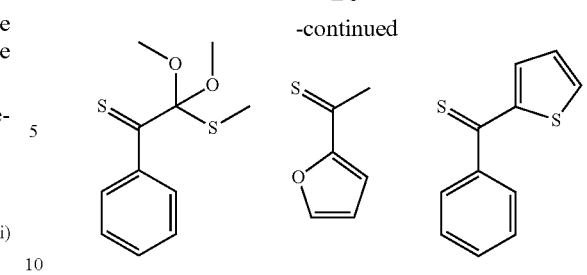

Specific examples of compound (A) having a partial structure represented by formula (iii) include:

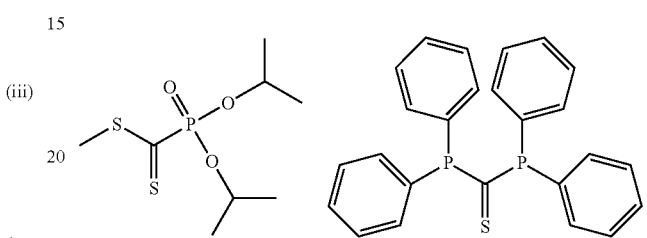

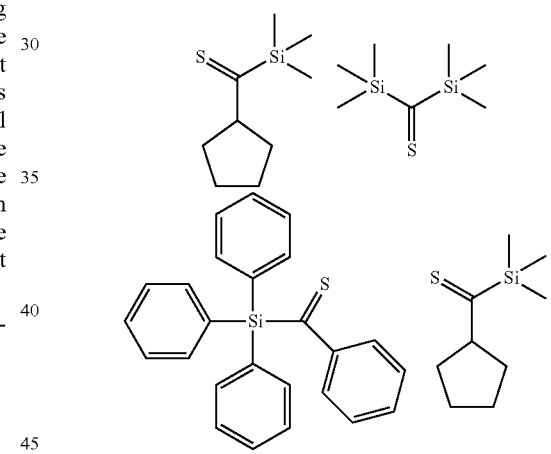

An electrolyte liquid used in an exemplary embodiment of the invention generally contains a non-aqueous electrolyte solvent which is stable at an operation voltage of the battery. Specific examples of the non-aqueous electrolyte solvent include non-protic organic solvents such as: cyclic-chain type carbonates such as propylene carbonate (PC), ethylene carbonate (EC), butylene carbonate (BC), and vinylene carbonate (VC); linear-chain type carbonates such as dimethyl carbonate (DMC), diethyl carbonate (DEC), ethyl methyl carbonate (EMC), and dipropyl carbonate (DPC); propylene carbonate derivatives; and aliphatic carboxylates such as methyl formate, methyl acetate, and ethyl propionate. As the non-aqueous electrolyte solvent, cyclic-chain type or linear-chain type carbonates such as ethylene carbonate (EC), propylene carbonate (PC), butylene carbonate (BC), vinylene carbonate (VC), dimethyl carbonate (DMC), diethyl carbonate (DEC), ethyl methyl carbonate (MEC), and dipropyl carbonate (DPC) are preferable. The non-aqueous electrolyte solvent can be used alone, or in combination with two or more kinds.

The content of compound (A) is preferably 0.005 to 20 mass % with respect to the total of compound (A) and a non-aqueous electrolyte solvent from the viewpoint of effectively forming a coating on the surface of the negative electrode, is more preferably 0.5 to 10 mass %, and is further preferably 1 to 5 mass %.

An electrolyte liquid used in an exemplary embodiment of the invention is formed by adding a supporting salt to a mixture liquid of compound (A) and a non-aqueous electrolyte solvent. Specific examples of the supporting salt include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$ and $LiN(CF_3SO_2)_2$. The supporting salt can be used alone, or in combination with two or more kinds.

Note that, the above-mentioned electrolyte liquid is applicable to not only a secondary battery having the above-mentioned negative electrode but also a secondary battery having another negative electrode.

[4] Separator

As a separator, a porous film or a nonwoven cloth of polypropylene, polyethylene or the like can be used. A separator in which these are stacked can also be used.

[5] Package

A package is arbitrarily selected as long as it is stable against an electrolyte liquid and it has a sufficient water vapor barrier property. For example, in the case of a stacked laminate type secondary battery, a lamination film of polypropylene, polyethylene or the like which is coated with aluminum or silica is preferably used as a package. In particular, it is preferable to use an aluminum lamination film from the standpoint of suppressing the volume expansion.

In the case of a secondary battery in which a lamination film is used as a package, when a gas is generated, a distortion of the electrode assembly becomes much larger than in the case of a secondary battery in which a metal can is used as a package. This is because the lamination film is easily deformed by the inner pressure of the secondary battery in comparison with the metal can. Further, in the case of the secondary battery in which a lamination film is used as a package, when it is sealed, the inner pressure of the battery is generally set to be lower than atmospheric pressure. Thus, the battery does not have extra space inside, which is easy to directly result in a volume change of the battery and a deformation of the electrode assembly when a gas is generated.

However, a secondary battery according to an exemplary embodiment of the invention can prevent the above-mentioned problem. As a result, a stacked laminate type lithium ion secondary battery which is cheap and which is superior in that there is more latitude to increase cell capacity by changing the number of laminations can be provided.

EXAMPLE

As follows, an exemplary embodiment of the invention is concretely explained by the Examples.

Example 1

A negative electrode active substance which contained silicon (Si), an amorphous silicon oxide ($SiO_x$, $0<x\leq2$) and a carbon (C) at a mass ratio of 29:61:10 was obtained according to the method described in Patent Document 3. Note that, in this negative electrode active substance, the silicon was dispersed in the amorphous silicon oxide, and the silicon and the amorphous silicon oxide were covered with the carbon. This negative electrode active substance (average particle diameter D50=5 μm) and a polyimide (PI, produced by UBE INDUSTRIES, trade name: U varnish A) as a negative electrode binder were weighed at a mass ratio of 90:10, and they were mixed with n-methylpyrrolidone to prepare a negative electrode slurry. The negative electrode slurry was applied on a copper foil having a thickness of 10 μm and was then dried, and it was further heat-treated under nitrogen atmosphere at 300° C. to produce a negative electrode.

A lithium nickelate ($LiNi_{0.80}Co_{0.15}Al_{0.15}O_2$) as a positive electrode active substance, carbon black as an electroconductive auxiliary material, and a polyvinylidene fluoride as a positive electrode binder were weighed at a mass ratio of 90:5:5, they were mixed with n-methylpyrrolidone to prepare a positive electrode slurry. The positive electrode slurry was applied on an aluminum foil having a thickness of 20 μm and was then dried, and it was further pressed to produce a negative electrode.

Three layers of the positive electrode obtained and four layers of the negative electrode obtained were alternately stacked with a polypropylene porous film as a separator placed therebetween. End parts of the positive electrode collectors which were not covered with the positive electrode active substance and end parts of the negative electrodes collectors which were not covered with the negative electrode active substance were respectively welded. Further, an aluminum positive electrode terminal and a nickel negative electrode terminal were respectively welded to the welded parts, to obtain an electrode assembly which had a planar stacking conformation.

On the other hand, 99.0 parts by mass of a carbonate non-aqueous electrolyte solvent consisting of EC/PC/DMC/EMC/DEC=20/20/20/20/20 (volume ratio) and 1.0 part by mass of a compound represented by following formula (1) as compound (A) (content of compound (A): 1 mass %) were mixed, and $LiPF_6$ as a supporting salt was further dissolved at a concentration of 1 mol/l to prepare an electrolyte liquid.

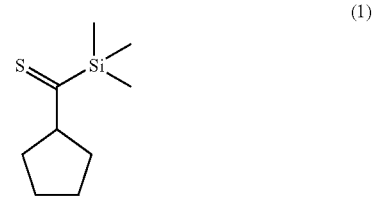

(1)

The above-mentioned electrode assembly was enclosed in an aluminum lamination film as a package and the electrolyte liquid was supplied to the inside. Then, it was sealed with depressurizing it to 0.1 atm to produce a secondary battery.

Example 2

This Example was carried out in the same manner as Example 1 except that the content of compound (A) was set to be 0.5 mass %.

Example 3

This Example was carried out in the same manner as Example 1 except that the content of compound (A) was set to be 2.0 mass %.

Example 4

This Example was carried out in the same manner as Example 1 except that the content of compound (A) was set to be 5.0 mass %.

Example 5

This Example was carried out in the same manner as Example 1 except that the content of compound (A) was set to be 10.0 mass %.

Example 6

This Example was carried out in the same manner as Example 1 except that a compound represented by following formula (2) was used as compound (A).

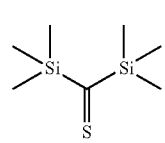
(2)

Example 7

This Example was carried out in the same manner as Example 1 except that a compound represented by following formula (3) was used as compound (A).

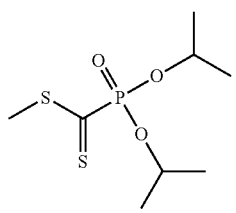
(3)

Example 8

This Example was carried out in the same manner as Example 1 except that a compound represented by following formula (4) was used as compound (A).

(4)

Example 9

This Example was carried out in the same manner as Example 1 except that a compound represented by following formula (5) was used as compound (A).

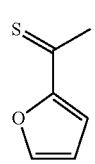
(5)

Example 10

This Example was carried out in the same manner as Example 1 except that a compound represented by following formula (6) was used as compound (A).

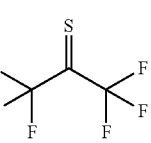
(6)

Example 11

This Example was carried out in the same manner as Example 1 except that a compound represented by following formula (7) was used as compound (A).

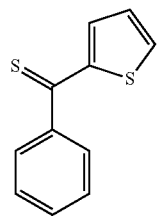
(7)

Example 12

This Example was carried out in the same manner as Example 1 except that a compound represented by following formula (8) was used as compound (A).

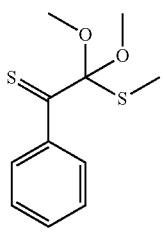
(8)

Example 13

This Example was carried out in the same manner as Example 1 except that a compound represented by following formula (9) was used as compound (A).

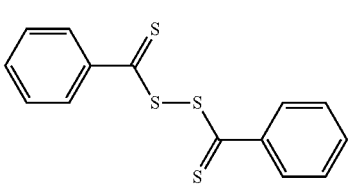
(9)

Example 14

This Example was carried out in the same manner as Example 1 except that a compound represented by following formula (10) was used as compound (A).

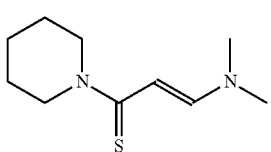

(10)

Example 15

This Example was carried out in the same manner as Example 1 except that a compound represented by following formula (11) was used as compound (A).

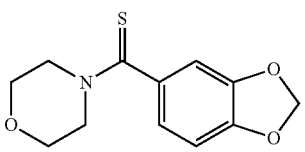

(11)

Example 16

This Example was carried out in the same manner as Example 1 except that a compound represented by following formula (12) was used as compound (A).

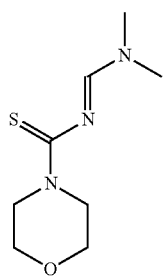

(12)

Example 17

This Example was carried out in the same manner as Example 1 except that a compound represented by following formula (13) was used as compound (A).

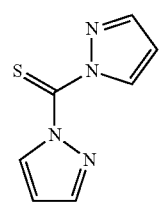

(13)

Example 18

This Example was carried out in the same manner as Example 1 except that a compound represented by following formula (14) was used as compound (A).

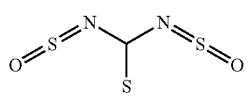

(14)

Example 19

This Example was carried out in the same manner as Example 1 except that a polyamide-imide (PAI, produced by TOYOBO CO., LTD., trade name: VYLOMAX (registered trade mark)) was used as the negative electrode binder.

Example 20

This Example was carried out in the same manner as Example 1 except that a polyvinylidene fluoride (PVDF, produced by KUREHA CORPORATION, trade name: KF polymer #1300) was used as the negative electrode binder.

Example 21

A silicon (Si) having an average particle diameter of 5 μm, an amorphous silicon oxide ($SiO_x$, $0<x\leq2$) having an average particle diameter of 13 μm, and a graphite (C) having an average particle diameter of 30 μm were weighed at a mass ratio of 29:61:10, and were mixed by a so-called mechanical milling for 24 hours to obtain a negative electrode active substance. Note that, in this negative electrode active substance, the silicon was dispersed in the silicon oxide, and the silicon and the amorphous silicon oxide were covered with the graphite. And, this Example was carried out in the same manner as Example 1 except that this negative electrode active substance (average particle diameter D50=5 μm) was used.

Example 22

A silicon (Si) having an average particle diameter of 5 μm and a graphite (C) having an average particle diameter of 30 μm were weighed at a mass ratio of 90:10, and were mixed by a so-called mechanical milling for 24 hours to obtain a negative electrode active substance. Note that, in this negative electrode active substance, the silicon was covered with the graphite. And, this Example was carried out in the same manner as Example 1 except that this negative electrode active substance (average particle diameter D50=5 μm) was used.

Example 23

An amorphous silicon oxide ($SiO_x$, $0<x\leq2$) having an average particle diameter of 13 μm, and a graphite (C) having an average particle diameter of 30 μm were weighed at a mass ratio of 90:10, and were mixed by a so-called mechanical milling for 24 hours to obtain a negative electrode active substance. Note that, in this negative electrode active substance, the amorphous silicon oxide was covered with the graphite. And, this Example was carried out in the same manner as Example 1 except that this negative electrode active substance (average particle diameter D50=5 μm) was used.

Example 24

A silicon (Si) having an average particle diameter of 6 μm, an amorphous silicon oxide (SiO$_x$, 0<x≤2) having an average particle diameter of 13 μm, and a graphite (C) having an average particle diameter of 30 μm were weighed at a mass ratio of 29:61:10, and the mixed powder was used as a negative electrode active substance with no particular treatment. Note that, in this negative electrode active substance, the silicon and the amorphous silicon oxide were not covered with the graphite. And, this Example was carried out in the same manner as Example 1 except that this negative electrode active substance was used.

Example 25

This Example was carried out in the same manner as Example 24 except that a polyamide-imide (PAI, produced by TOYOBO CO., LTD., trade name: VYLOMAX (registered trade mark)) was used as the negative electrode binder.

Example 26

This Example was carried out in the same manner as Example 24 except that a polyvinylidene fluoride (PVDF, produced by KUREHA CORPORATION, trade name: KF polymer #1300) was used as the negative electrode binder.

Example 27

A silicon (Si) having an average particle diameter of 5 μm and a graphite (C) having an average particle diameter of 30 μm were weighed at a mass ratio of 90:10, and the mixed powder was used as a negative electrode active substance with no particular treatment. Note that, in this negative electrode active substance, the silicon was not covered with the graphite. And, this Example was carried out in the same manner as Example 1 except that this negative electrode active substance (average particle diameter D50=5 μm) was used.

Example 28

An amorphous silicon oxide (SiO$_x$, 0<x≤2) having an average particle diameter of 13 μm, and a graphite (C) having an average particle diameter of 30 μm were weighed at a mass ratio of 90:10, and the mixed powder was used as a negative electrode active substance with no particular treatment. Note that, in this negative electrode active substance, the amorphous silicon oxide was not covered with the graphite. And, this Example was carried out in the same manner as Example 1 except that this negative electrode active substance (average particle diameter D50=5 μm) was used.

Comparative Example 1

This Comparative Example was carried out in the same manner as Example 1 except that compound (A) was not used.

Comparative Example 2

This Comparative Example was carried out in the same manner as Example 1 except that 1,3-propane sultone was used instead of compound (A).

Comparative Example 3

This Comparative Example was carried out in the same manner as Example 22 except that compound (A) was not used.

Comparative Example 4

This Comparative Example was carried out in the same manner as Example 23 except that compound (A) was not used.

Comparative Example 5

This Comparative Example was carried out in the same manner as Example 24 except that compound (A) was not used.

Comparative Example 6

This Comparative Example was carried out in the same manner as Example 27 except that compound (A) was not used.

Comparative Example 7

This Comparative Example was carried out in the same manner as Example 28 except that compound (A) was not used.

<Evaluation>

As a battery property at a high temperature of the secondary batteries produced in Examples 1 to 28 and Comparative Example 1 to 7, the cycle property and the rate property at 60° C. were evaluated. Specifically, a cycle test, in which the secondary battery was repeatedly charged and discharged 500 times within a voltage range of 2.5 V to 4.1 V in a thermostatic oven kept at a temperature of 60° C., was carried out. And, the cycle retention ratio was calculated by (discharged capacity at the 500$^{th}$ cycle)/(discharged capacity at the 1$^{st}$ cycle) (unit: %), and the swelling ratio was calculated by (battery volume at the 500$^{th}$ cycle)/(battery volume before cycle) (unit: %). Also, the discharge capacities ($C_{5C}$ and $C_{0.2C}$) at 5 C and 0.2 C of the secondary battery after the cycle test were evaluated in a thermostatic oven kept at a temperature of 20° C., and the rate property was calculated by the ratio $C_{5C}/C_{0.2C}$. The results are shown in TABLE 1.

TABLE 1

| | compound (A) | | negative electrode active substance Si/SiO$_x$/C | | negative electrode | cycle retention ratio | swelling ratio | rate property |
| --- | --- | --- | --- | --- | --- | --- | --- | --- |
| | kind | wt % | wt ratio | carbon covering | binder kind | (%) | (%) | ($C_{5C}/C_{0.2C}$) |
| Example1 | (1) | 1.0 | 29/61/10 | ○ | PI | 0.69 | 1.04 | 0.39 |
| Example2 | (1) | 0.5 | 29/61/10 | ○ | PI | 0.61 | 1.10 | 0.35 |
| Example3 | (1) | 2.0 | 29/61/10 | ○ | PI | 0.71 | 1.03 | 0.41 |

TABLE 1-continued

| | compound (A) | | negative electrode active substance Si/SiO$_x$/C | | negative electrode | cycle retention | swelling | rate |
|---|---|---|---|---|---|---|---|---|
| | kind | wt % | wt ratio | carbon covering | binder kind | ratio (%) | ratio (%) | property ($C_{5C}/C_{0.2C}$) |
| Example4 | (1) | 5.0 | 29/61/10 | o | PI | 0.69 | 1.04 | 0.42 |
| Example5 | (1) | 10.0 | 29/61/10 | o | PI | 0.64 | 1.06 | 0.43 |
| Example6 | (2) | 1.0 | 29/61/10 | o | PI | 0.72 | 1.07 | 0.41 |
| Example7 | (3) | 1.0 | 29/61/10 | o | PI | 0.64 | 1.17 | 0.33 |
| Example8 | (4) | 1.0 | 29/61/10 | o | PI | 0.60 | 1.07 | 0.40 |
| Example9 | (5) | 1.0 | 29/61/10 | o | PI | 0.65 | 1.11 | 0.37 |
| Example10 | (6) | 1.0 | 29/61/10 | o | PI | 0.70 | 1.05 | 0.42 |
| Example11 | (7) | 1.0 | 29/61/10 | o | PI | 0.67 | 1.04 | 0.35 |
| Example12 | (8) | 1.0 | 29/61/10 | o | PI | 0.69 | 1.02 | 0.38 |
| Example13 | (9) | 1.0 | 29/61/10 | o | PI | 0.66 | 1.21 | 0.38 |
| Example14 | (10) | 1.0 | 29/61/10 | o | PI | 0.68 | 1.13 | 0.36 |
| Example15 | (11) | 1.0 | 29/61/10 | o | PI | 0.62 | 1.20 | 0.34 |
| Example16 | (12) | 1.0 | 29/61/10 | o | PI | 0.64 | 1.09 | 0.33 |
| Example17 | (13) | 1.0 | 29/61/10 | o | PI | 0.62 | 1.14 | 0.32 |
| Example18 | (14) | 1.0 | 29/61/10 | o | PI | 0.70 | 1.16 | 0.38 |
| Example19 | (1) | 1.0 | 29/61/10 | o | PAI | 0.67 | 1.04 | 0.38 |
| Example20 | (1) | 1.0 | 29/61/10 | o | PVDF | 0.60 | 1.30 | 0.33 |
| Example21 | (1) | 1.0 | 29/61/10 | o | PI | 0.68 | 1.03 | 0.37 |
| Example22 | (1) | 1.0 | 90/0/10 | o | PI | 0.56 | 1.61 | 0.45 |
| Example23 | (1) | 1.0 | 0/90/10 | o | PI | 0.56 | 1.01 | 0.32 |
| Example24 | (1) | 1.0 | 29/61/10 | x | PI | 0.57 | 1.08 | 0.32 |
| Example25 | (1) | 1.0 | 29/61/10 | x | PAI | 0.57 | 1.10 | 0.32 |
| Example26 | (1) | 1.0 | 29/61/10 | x | PVDF | 0.55 | 1.33 | 0.28 |
| Example27 | (1) | 1.0 | 90/0/10 | x | PI | 0.56 | 1.63 | 0.41 |
| Example28 | (1) | 1.0 | 0/90/10 | x | PI | 0.56 | 1.01 | 0.26 |
| Comparative Example1 | — | — | 29/61/10 | o | PI | 0.55 | 1.70 | 0.02 |
| Comparative Example2 | (1,3-PS) | 1.0 | 29/61/10 | o | PI | 0.57 | 1.71 | 0.01 |
| Comparative Example3 | — | — | 90/0/10 | o | PI | 0.43 | 1.68 | 0.10 |
| Comparative Example4 | — | — | 0/90/10 | o | PI | 0.42 | 1.09 | 0.01 |
| Comparative Example5 | — | — | 29/61/10 | x | PI | 0.44 | 1.21 | 0.01 |
| Comparative Example6 | — | — | 90/0/10 | x | PI | 0.40 | 1.71 | 0.07 |
| Comparative Example7 | — | — | 0/90/10 | x | PI | 0.39 | 1.10 | 0.01 |

As shown in TABLE 1, the battery properties at 60° C. of the secondary batteries produced in Examples 1 to 28 were better than the battery property of the secondary battery produced in the corresponding Comparative Example. In particular, in Examples 1 to 23 in which the negative electrode active substance where at least one of metal (a) and metal oxide (b) were covered by carbon (c) was used, the secondary battery had a further better battery property at 60° C. Also, in Examples 1 to 19, 21 to 25 and 27 to 28 in which the negative electrode active substance containing metal (a) and the polyimide or the polyamide-imide was used as the negative electrode binder, the secondary battery had a further better battery property at 60° C. From the results, it has become clear that a secondary battery having a good battery property at a high temperature can be obtained according to an exemplary embodiment of the invention.

The present application claims the priority based on Japanese Patent Application No. 2010-231588, filed on Oct. 14, 2010, all the disclosure of which is incorporated herein by reference.

The present invention was explained with reference to embodiments and Examples, but the present invention is not limited to the above-mentioned embodiments and the Examples. In the constituents and the detail of the present invention, various changings which are understood by a person ordinarily skilled in the art can be made within the scope of the invention.

INDUSTRIAL APPLICABILITY

An exemplary embodiment of the invention can be utilized in every industrial field that requires a power supply and in an industrial field concerning a transportation, a storage and a supply of an electrical energy. Specifically, it can be utilized, for examples, for a power supply of a mobile device such as a mobile phone and a laptop computer; a power supply of a moving or a transport medium such as a train, a satellite and a submarine, and which includes an electric vehicle such as an electric car, a hybrid car, an electric motorcycle and an electric power-assisted bicycle; a back-up power supply such as UPS; and a power storage device of an electric power which is generated by a solar power generation or a wind power generation.

REFERENCE SIGNS LIST a negative electrode
b separator
c positive electrode d negative electrode collector
e positive electrode collector
f positive electrode terminal
g negative electrode terminal

What is claimed is:

1. A secondary battery, comprising a negative electrode and an electrolyte liquid;
   wherein the negative electrode contains a negative electrode active substance, a negative electrode collector and a negative electrode binder which binds the negative electrode active substance to the negative electrode collector;
   wherein the negative electrode active substance contains at least one of a metal (a) that can be alloyed with lithium and a metal oxide (b) that can absorb and desorb a lithium ion, and a carbon material (c) which covers at least one of the metal (a) and the metal oxide (b); and
   wherein the electrolyte liquid comprises compound (A) having a C=S bond,
   wherein compound (A) is a compound represented by following formula (I) or (II):

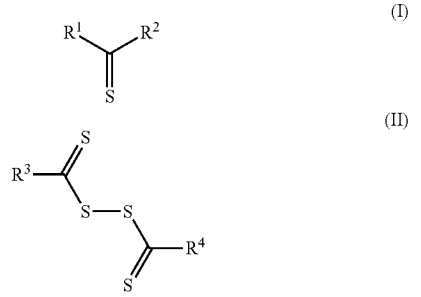

[In formulae (I) and (II), $R^1$ to $R^4$ are each independently a substituted or non-substituted alkyl group, a substituted or non-substituted alkylene group, a substituted or non-substituted cycloalkyl group, a substituted or non-substituted aryl group, a substituted or non-substituted heterocyclic group, —NR'$_2$, —N=R', —N=C=O, —N=S=O, —SiR'$_3$, —SR' or —P(=O)(OR)$_2$, and R' is each independently a substituted or non-substituted alkyl group, a substituted or non-substituted alkylene group, a substituted or non-substituted cycloalkyl group, a substituted or non-substituted aryl group or a substituted or non-substituted heterocyclic group.]
wherein compound (A) has a partial structure represented by any one of following formulae (i) to (iii):

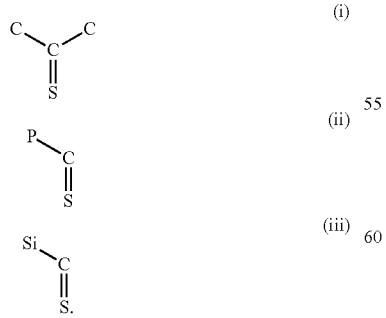

2. The secondary battery according to claim 1, wherein compound (A) has a partial structure represented by above-mentioned formula (iii).

3. The secondary battery according to claim 1, wherein the electrolyte liquid comprises compound (A) and a non-aqueous electrolyte solvent, and wherein a content of compound (A) in the electrolyte liquid is 0.005 to 20 mass % with respect to a total of compound (A) and the non-aqueous electrolyte solvent.

4. The secondary battery according to claim 1, wherein the negative electrode binder is a polyimide or a polyamide-imide.

5. The secondary battery according to claim 1, wherein the negative electrode active substance is formed by coating the metal (a) and the metal oxide (b) with the carbon material (c).

6. The secondary battery according to claim 5, wherein the metal oxide (b) is an oxide of metal which constitutes the metal (a).

7. The secondary battery according to claim 5, wherein all or a part of the metal (a) is dispersed in the metal oxide (b).

8. The secondary battery according to claim 1, wherein all or a part of the metal oxide (b) has an amorphous structure.

9. The secondary battery according to claim 1, wherein the metal (a) is silicon.

10. The secondary battery according to claim 1, wherein the negative electrode and a positive electrode are oppositely disposed to form an electrode assembly, and wherein the electrode assembly has a planar stacking conformation.

11. The secondary battery according to claim 1, wherein the negative electrode and the electrolyte liquid are enclosed inside a package, and wherein the package is an aluminum lamination film.

12. A secondary battery, comprising a negative electrode and an electrolyte liquid;
    wherein the negative electrode contains a negative electrode active substance which comprises a metal (a) that can be alloyed with lithium, a negative electrode collector and at least one of a polyimide and a polyamide-imide as a negative electrode binder which binds the negative electrode active substance to the negative electrode collector; and
    wherein the electrolyte liquid comprises a compound (A) having a C=S bond
    wherein the compound (A) is a compound represented by following formula (I) or (II):

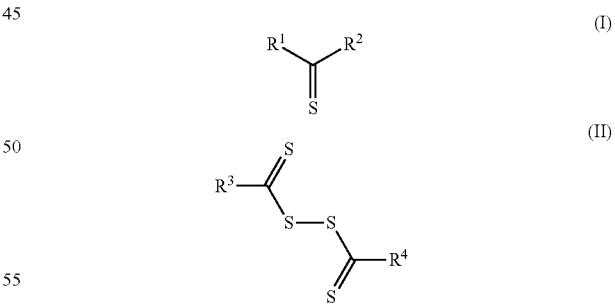

[In formulae (I) and (II), $R^1$ to $R^4$ are each independently a substituted or non-substituted alkyl group, a substituted or non-substituted alkylene group, a substituted or non-substituted cycloalkyl group, a substituted or non-substituted aryl group, a substituted or non-substituted heterocyclic group, —NR'$_2$, —N=R', —N=C=O, —N=S=O, —SiR'$_3$, —SR' or —P(=O)(OR)$_2$, and R' is each independently a substituted or non-substituted alkyl group, a substituted or non-substituted alkylene group, a substituted or non-substituted cycloalkyl group, a substituted or non-substituted aryl group or a substituted or non-substituted heterocyclic group.] wherein the compound (A) has a partial structure represented by any one of following formulae (i) to (iii):

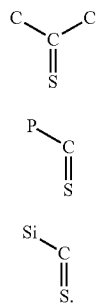

13. The secondary battery according to claim 12, wherein the compound (A) has a partial structure represented by above-mentioned formula (iii).

14. The secondary battery according to claim 12, wherein the electrolyte liquid comprises the compound (A) and a non-aqueous electrolyte solvent, and wherein a content of the compound (A) in the electrolyte liquid is 0.005 to 20 mass % with respect to a total of the compound (A) and the non-aqueous electrolyte solvent.

15. The secondary battery according to claim 12, wherein the negative electrode active substance comprises a metal oxide (b) that can absorb and desorb a lithium ion.

16. The secondary battery according to claim 15, wherein the metal oxide (b) is an oxide of metal which constitutes the metal (a).

17. The secondary battery according to claim 15, wherein all or a part of the metal (a) is dispersed in the metal oxide (b).

18. The secondary battery according to claim 15, wherein all or a part of the metal oxide (b) has an amorphous structure.

19. The secondary battery according to claim 12, wherein the metal (a) is silicon.

20. The secondary battery according to claim 12, wherein the negative electrode active substance comprises a carbon material (c) that can absorb and desorb a lithium ion.

21. The secondary battery according to claim 20, wherein the negative electrode active substance is formed by covering the metal (a) with the carbon material (c).

22. The secondary battery according to claim 20, wherein the negative electrode active substance is formed by covering the metal (a) and the metal oxide (b) with the carbon material (c).

23. The secondary battery according to claim 12, wherein the negative electrode and a positive electrode are oppositely disposed to form an electrode assembly, and wherein the electrode assembly has a planar stacking conformation.

24. The secondary battery according to claim 12, wherein the negative electrode and the electrolyte liquid are enclosed inside a package, and wherein the package is an aluminum lamination film.

25. An electrolyte liquid for a secondary battery, comprising a compound (A) having a partial structure represented by any one of following formulae (i) to (iii):

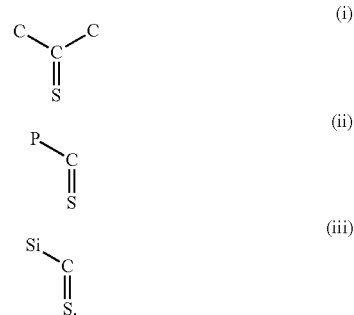

26. The electrolyte liquid for a secondary battery according to claim 25, wherein the compound (A) has a partial structure represented by above-mentioned formula (iii).

27. The secondary battery according to claim 25, wherein the electrolyte liquid comprises the compound (A) and a non-aqueous electrolyte solvent, and wherein a content of the compound (A) in the electrolyte liquid is 0.005 to 20 mass % with respect to a total of the compound (A) and the non-aqueous electrolyte solvent.

* * * * *